United States Patent [19]

Nigrelli

[11] Patent Number: 4,905,547

[45] Date of Patent: Mar. 6, 1990

[54] MASTER KEY FOR WHEEL COVER LOCK BOLTS OR NUTS

[75] Inventor: Joseph Nigrelli, 5687 Heron Ct., Norcross, Ga. 30071

[73] Assignee: Joseph Nigrelli, Alpharetta, Ga.

[21] Appl. No.: 803,519

[22] Filed: Dec. 2, 1985

Related U.S. Application Data

[63] Continuation of Ser. No. 587,151, Mar. 7, 1984, abandoned.

[51] Int. Cl.⁴ .............................................. B25B 13/06
[52] U.S. Cl. .................................. 81/176.15; 81/121.1
[58] Field of Search ............... 81/121.1, 176.1, 176.15, 81/176.2, 121.1, 124.1

[56] References Cited

U.S. PATENT DOCUMENTS

| | | |
|---|---|---|
| 799,644 | 9/1905 | Goserud ............................ 81/176.1 |
| 1,010,503 | 12/1911 | Langen ............................. 81/176.1 |
| 1,629,217 | 5/1927 | Largent et al. .................... 81/124.1 |
| 2,848,916 | 8/1958 | Reynolds .......................... 81/121.1 |
| 3,519,979 | 7/1970 | Badenstein ....................... 81/121.1 |
| 3,695,124 | 10/1972 | Myers ............................... 81/121 R |
| 4,125,913 | 11/1978 | Lewis ............................... 81/121.1 |

FOREIGN PATENT DOCUMENTS

| | | | |
|---|---|---|---|
| 1114623 | 4/1956 | France ............................. 81/176.1 |
| 557220 | 5/1973 | Switzerland ...................... 81/121 R |

Primary Examiner—James G. Smith

[57] ABSTRACT

A master key or wrench for the removal of expensive automobile wheel cover lock bolts or lock nuts is disclosed. The master key is configured to engage easily with any of the diverse shapes of commercial lock bolts and nuts commonly used to secure wheel covers against removal by means of ordinary tools.

17 Claims, 2 Drawing Sheets

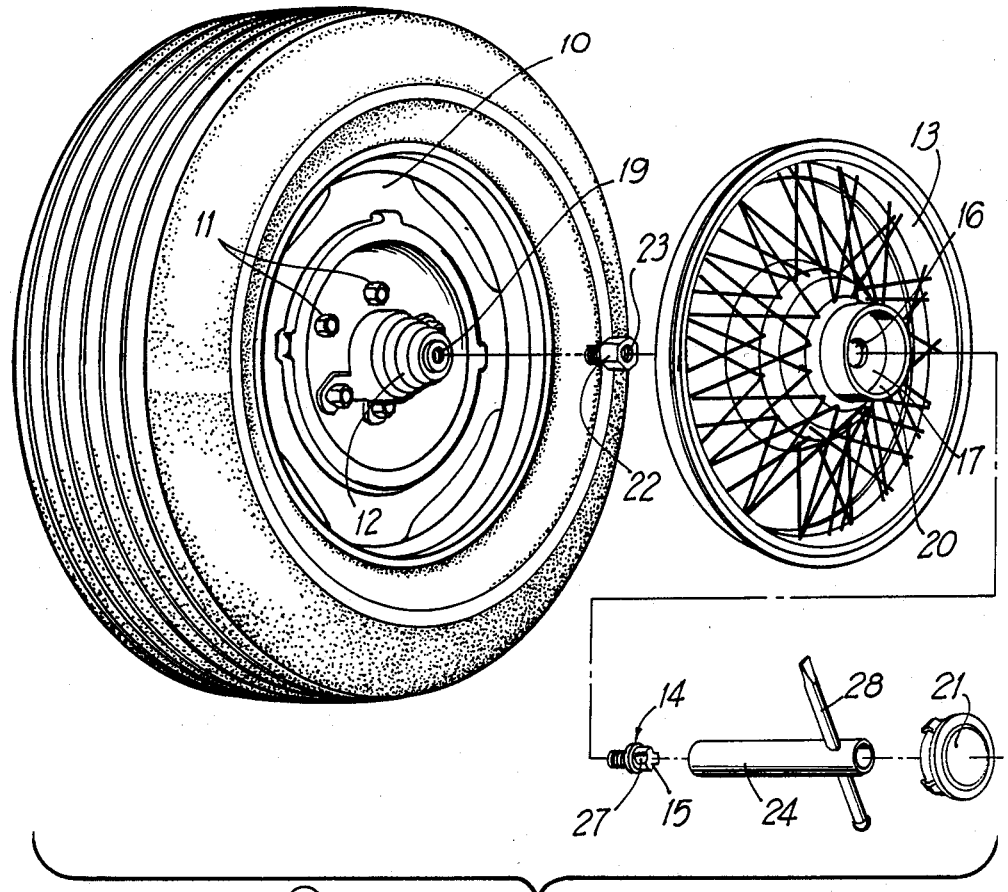
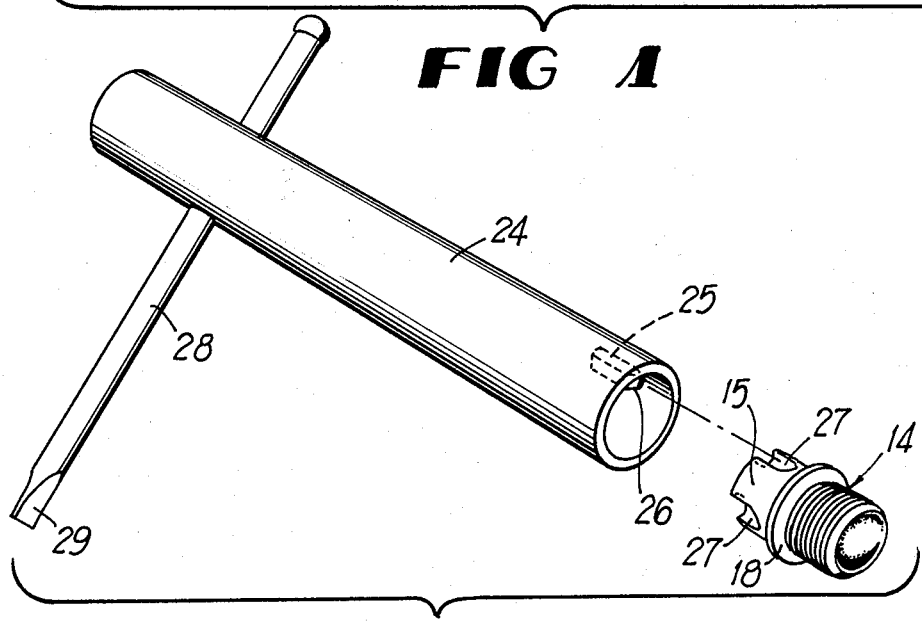
FIG 1
FIG 2

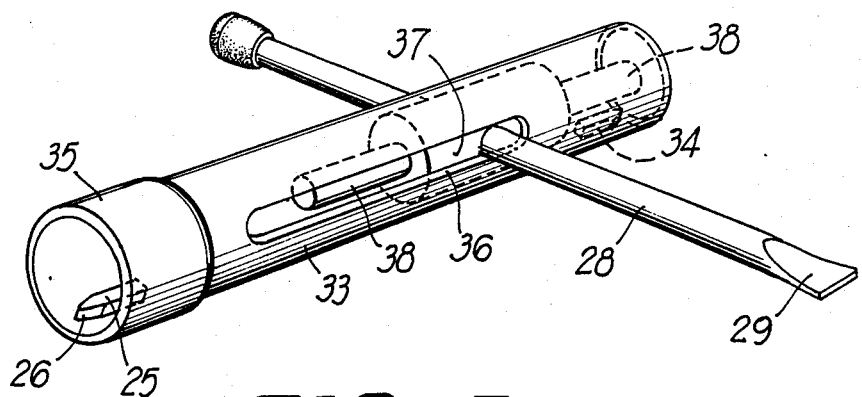
FIG 3
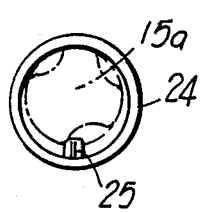 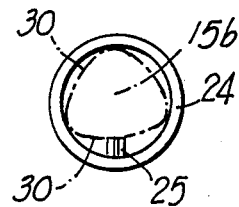 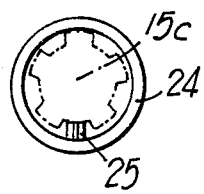
FIG 4    FIG 5    FIG 6
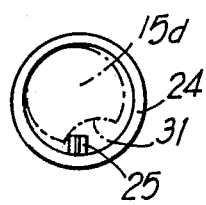 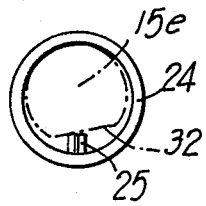
FIG 7    FIG 8

MASTER KEY FOR WHEEL COVER LOCK BOLTS OR NUTS

This is a continuation of co-pending application Ser. No. 587,151 filed on 3/7/84, now abandoned.

BACKGROUND OF THE INVENTION

Expensive automobile wheel covers, such as wire wheel covers, are subject to frequent theft unless secured by special locking bolts or nuts. Commonly employed locking bolts and nuts come in various shapes, each requiring a special key or wrench to manipulate, and none can be turned by an ordinary hexagon wrench, adjustable wrench, pliers or screwdriver. In addition to requiring a special key or wrench for each separate type of locking nut or bolt now on the market, the intricacy of design of the bolt or nut and its smallness makes it quite difficult to engage the special wrench with the lock nut or bolt, in some cases, such as in the dark. In these cases, engagement of the wrench can only be effected by feel.

In view of the above, the objective of this invention is to provide a master key or wrench which is universal in the sense that it is readily engageable with any of the diverse types of wheel cover locking fasteners commonly in use. Secondly, the master wrench according to the present invention is more easily engaged with all of the locking fasteners due to the act that the wrench employs a single internal lug within a cylindrical shell which is more easily slipped into engagement with any of the variously-shaped locking fasteners, compared to the prior art wrenches which have a complex cross sectional shape requiring precise registration with the fastener to enable engagement.

Additional objects are to provide a master wrench of the above type which is capable of engaging wheel cover locking fasteners of different sizes and which includes means to dislodge removed fasteners from inside the tubular wrench body, where they sometimes become lodged.

The master wrench according to the invention lends itself particularly to usage by service station and other automotive repair personnel who must frequently work on automobiles whose wheel covers are secured by a wide variety of types of locking bolts and nuts.

Other objects and advantages of the invention will become apparent to those skilled in the art during the course of the following description.

BRIEF DESCRIPTION OF THE DRAWINGS

FIG. 1 is an exploded perspective view of the invention in association with an automobile wheel, whire wheel cover, shaped wheel cover locking bolt, and a wheel cover medallion.

FIG. 2 is an enlarged exploded perspective view showing the universal key or wrench according to the invention in association with one particular type of wheel cover locking bolt.

FIG. 3 is a perspective view of a modified form of the invention.

FIGS. 4 through 8 are end elevational views of the master wrench engaged with various forms of locking fasteners commonly used with expensive wheel covers.

DETAILED DESCRIPTION

Referring to the drawings in detail wherein like numerals designate like parts, a conventional automobile wheel 10 secured by lug bolts 11 includes a projecting center hub portion 12 to which a wire-type wheel cover 13 is locked by a locking bolt 14 having a shaped turning head 15. The locking bolt 14 shown in FIGS. 1 and 2 is one of a number of different types commonly employed to lock wheel covers in place, other commercial types being shown in phantom lines in FIGS. 4–8 of the drawings.

The wheel cover 13 has a central opening 16 which receives the threaded end portion of the locking bolt, the opening 16 being surrounded by a flat disc portion 17 against which an annular flange 18 of the locking bolt bears. The threaded portion of the locking bolt 14 is received in a threaded central opening 19 of hub portion 12, the shaped turning head 15 projecting outwardly of the disc portion 17 and being surrounded by a hub sleeve 20 of the wheel cover closed by a snap-on medallion 21.

In some instances, depending upon the spacing of disc portion 17 from the hub portion 12, an intermediate adapter bolt 22 may be required. In these cases, the adapter bolt is threaded tightly into the opening 19 and the shaped locking bolt 14 is then threaded into a threaded opening 23 provided in the outer end of the adapter bolt.

In any case, whether or not the adapter bolt 22 is employed, a special key or wrench is required to engage the shaped turning head 15 of the locking bolt 14. Other special wrenches are required to engage each of the diversely-shaped heads 15a, 15b, 15c, 15d and 15e of locking bolts depicted in FIGS. 4 through 8. There are as many as twelve or more types of wheel cover locking bolts presently on the market, requiring a corresponding number of special wrenches.

In lieu of locking bolts, some wheel covers are secured against theft by shaped locking nuts, in which cases the wheel structure 12 possesses an end threaded stud to receive the locking nut instead of threaded opening 19. The key or wrench forming the subject matter of this invention operates in the same manner with a shaped locking bolt or locking nut, the latter not being shown in the drawings. The master wrench according to the invention, FIGS. 1 and 2, comprises a straight cylindrical tube section 24 forming the body portion of the device. Within one end portion of this tube section is positioned a fixed somewhat elongated lug or projection 25, preferably having a tapered leading end 26 to facilitate engagement of the lug endwise into one of the recesses 27 of the shaped head 15 of locking bolt 14. Any selected one of the recesses 27 can receive the turning lug 25 of the wrench and the user of the wrench does not have to engage the lug in any particular one of the recesses 27, thus making the wrench easier to engage with a locking bolt or nut under all conditions, such as in poor light. The lug 25 is spaced somewhat inwardly of the leading end face of the tube section 24, as shown in FIGS. 2 and 3.

Near its opposite end, the tube section 24 has a transverse through opening which receives therethrough slidably a rod 28 serving as a turning handle for the wrench or key. One end of the rod 28 carries a flattened blade terminal 29 to facilitate prying off the medallion 21 to expose the shaped head 15 of the locking bolt for ready removal by the master wrench.

Again referring to FIGS. 4 through 8, it is shown that the master wrench can be easily engaged with any of the other diversely-shaped turning heads 15a ... 15e of the other types of bolts or nuts commonly used to lock on wheel covers. In all cases, the tubular body portion 24 is slipped telescopically over the shaped turning head 15 ... 15e and the end face of the tool will abut the flange 18. Each type of locking nut or bolt has a shaped head which will fit in the bore of body portion 24 and each has one or more peripheral recesses or spaces which can receive the rigid turning lug 25, as depicted in FIGS. 4–8. Specifically, the turning head 15a is similar to the head 15 and has three peripheral recesses, any one of which can receive the lug 25. The splined head 15c shown in FIG. 6 can also receive the lug 25 in any of five grooves. The modified triangular head 15b, FIG. 5, receives the lug 25 in a space between any of the side faces 30 of the head 15b and the bore of tube section 24. In FIGS. 7 and 8, the turning lug 25 is engaged in a shallow arcuate recess 31 of turning head 15d or with a flat face 32 on head 15e. Other engaging arrangements are possible, and the arrangements shown in the drawings are merely illustrative of the universality of the master wrench.

FIG. 3 of the drawings shows an alternative embodiment of the invention in which a straight tubular body portion 33 has a fixed lock bolt or nut turning lug 34 located in one end portion thereof to manipulate bolts or nuts of one diameter size. A somewhat enlarged cylindrical extension 35 on the other end of the tool having a separate turning lug is employed to manipulate locking bolts or nuts of a larger size.

The tube section 33 is also slotted longitudinally at 36 to receive the turning handle 28 slidably. The handle extends through a cylindrical plug element 37 which is slidable in the bore of tube section 33, and is equipped with opposite end pin extensions 38 which are used to dislodged by knocking out any removed locking nuts which may become stuck in the bore of the wrench body portion.

It may be seen that a master tool of great simplicity and convenience of use has been provided, which will enable an authorized user to quickly engage and turn virtually any of the variously-shaped wheel cover locking bolts or nuts. By virtue of its construction with only a single turning lug 25, the device is more easily engaged with a locking bolt or nut than the prior art tools which require precise registration of the end of the tool with the shaped portion of the locking fastener. This can be difficult in dark quarters. The advantages of the invention over the known prior art are now though to be evident.

It is to be understood that the forms of the invention herewith shown and described are to be taken as preferred examples of the same, and that various changes in the shape, size and arrangement of parts may be resorted to, without departing from the spirit of the invention or scope of the subjoined claims.

I claim:

1. A master tool for engaging and turning diverse types of wheel covers locking fasteners comprising an elongated body portion with a proximal end having a cylindrical bore and a distal end having a turning handle, said bore being sized to fit over a plurality of the variously-shaped bolt or nut turning heads of said locking fasteners, and only one turning lug disposed within said bore for telescopically entering a space formed between the bore of the tubular body portion and a peripheral part of the shaped turning head of a wheel cover locking fastener to universally engage and turn said turning heads.

2. A master tool as defined in claim 1, and said turning lug being elongated axially of the tubular body portion and being fixed to the bore of said body portion and having a tapered leading end spaced somewhat rearwardly of the adjacent end face of said body portion.

3. A master tool as defined in claim 1, and the tubular body portion comprising a single straight length of uniform diameter cylindrical tubing.

4. A master tool as defined in claim 1, and the tubular boy portion having an enlarged diameter extension on one end thereof, and another one of said turning lugs fixed within the bore of said extension, whereby wheel cover locking fasteners of a larger size may be engaged and turned by said tool.

5. A master tool as defined in claim 4, and reciprocatory means on said tubular body portion connected with and driven by said handle for dislodging locking fasteners which may be stuck within the tubular body portion.

6. A master tool for engaging and turning diverse types of wheel cover locking fasteners comprising a tubular body portion having a turning handle, a single fixed turning lug disposed in at least one end portion of the tubular body portion and being adapted to enter a space formed between the bore of the tubular body portion and a peripheral part of the shaped head of a wheel cover locking fastener when said body portion is placed telescopically over such shaped head, an enlarged diameter extension on the other end of said tubular body portion having another one of said turning lugs fixed within the bore of said enlarged diameter extension, whereby wheel cover locking fasteners of a larger size may be engaged and turned by said tool, and reciprocatory means on said tubular body portion connected with and driven by said handle for dislodging locking fasteners which may be stuck within the tubular body portion, the reciprocatory means comprising a double-ended plunger member movable within the bore of the tubular body portion, said body portion being slotted longitudinally in its opposite sides and said slots receiving and guiding said turning handle during reciprocation of said plunger member.

7. A master tool as defined in claim 1, and said turning handle extending across the axis of the tubular body portion and being slidable relative to the body portion and having a flattened blade-like end for prying operations.

8. A master tool to engage and turn wheel cover locking fasteners having variously-shaped turning heads comprising a single section of cylindrical tubing having a bore sized to fit over any of the variously-shaped bolt or nut turning heads, only one rigid turning lug secured within the bore of said turning near one end thereof and being tapered toward its leading end and projecting somewhat radially inwardly from the surface of said bore and terminating a substantial distance radially outwardly of the axial center of the bore, the leading end of said turning lug being spaced somewhat rearwardly of one end face of said tubing and being adapted to enter a space formed between the bore of the tubing and a peripheral part of the shaped turning head of a wheel cover locking fastener when said tubing is placed telescopically over such shaped head, thereby allowing said tool to universally engage any one of said turning heads, and a turning handle connected on said tubing near its rear end remote from said turning lug.

9. A master tool as defined in claim 6, and said turning lug being elongated axially of the tubular body portion and being fixed to the bore of said body portion and having a tapered leading end spaced somewhat rearwardly of the adjacent end face of said body portion.

10. A master tool as defined in claim 6, and the tubular body portion comprising a single straight length of uniform diameter cylindrical tubing.

11. A master tool as defined in claim 6, and the tubular body portion having an elongated diameter extension on one end thereof, and another one of said turning lugs fixed within the bore of said extension, whereby wheel cover locking fasteners of a larger size may be engaged and turned by said tool.

12. A master tool as defined in claim 6, and said turning handle extending across the axis of the tubular body portion and being slidable relative to the body portion and having a flattened blade-like end for prying operations.

13. A master tool for engaging and turning diverse types of wheel cover locking fasteners comprising a tubular body portion having a turning handle, a single fixed turning lug disposed in at least one end portion of the tubular body portion and being adapted to enter a space formed between the bore of the tubular body portion and a peripheral part of the shaped head of a wheel cover locking fastener when said body portion is placed telescopically over such shaped head, and reciprocatory means on said tubular body portion connected with and driven by said handle for dislodging locking fasteners which may be stuck within the tubular body portion, the reciprocatory means comprising a double-ended plunger member movable within the bore of the tubular body portion, said body portion being slotted longitudinally in its opposite side and said slots receiving and guiding said turning handle during reciprocation of said plunger member.

14. A master tool as defined in claim 13, and said turning lug being elongated axially of the tubular body portion and being fixed to the bore of said body portion and having a tapered leading end spaced somewhat rearwardly of the adjacent end face of said body portion.

15. A master tool as defined in claim 13, and the tubular body portion comprising a single straight length of uniform diameter cylindrical tubing.

16. A master tool as defined in claim 13, and the tubular body portion having an elongated diameter extension on one end thereof, and another one of said turning lugs fixed within the bore of said extension, whereby wheel cover locking fasteners of a larger size may be engaged and turned by said tool.

17. A master tool as defined in claim 13, and said turning handle extending across the axis of the tubular body portion and being slidable relative to the body portion and having a flattened blade-like end for prying operations.

* * * * *